United States Patent Office 3,359,318
Patented Dec. 19, 1967

3,359,318
DIFLUORAMINES AND THEIR PREPARATION
Clay Marcus Sharts, Woodbury, N.J., assignor to E. I. du Pont de Nemours and Company, Wilmington, Del., a corporation of Delaware
No Drawing. Filed Nov. 17, 1961, Ser. No. 154,386
8 Claims. (Cl. 260—563)

This invention relates to difluoramines and to a method of producing difluoramines.

In the past the preparation of fluorine compounds of moderate complexity has been carried out by indirect means because of the great chemical reactivity of fluorine. When direct fluorination with elemental fluorine is attempted on complex compounds, the carbon skeleton is degraded to give products of much lower molecular weight than the starting material; particularly when amines are fluorinated with fluorine does severe degradation occur. The reaction is so violent that explosions can occur.

Additionally, prior to the present invention difluoramino compounds were prepared by the addition of $N_2F_4$ to unsaturated linkages such as —C=C— and

to give compounds of the type

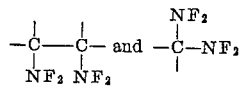

or by replacement of halides by —$NF_2$ groups. No satisfactory method existed for the preparation of 1,3-, 1,4-, 1,5- or 1,6-bisdifluoramines. By the invention disclosed herewithin such bisdifluoramines can be prepared in large quantity.

The present invention provides difluoramines by the direct reaction of elemental fluorine with amines.

In accordance with the present invention, difluoramines of the structural formula $RNF_2$, wherein R is a member of the group consisting of aliphatic and cycloaliphatic radicals, and bisdifluoramines of the structural formula $F_2NR'_mNF_2$, wherein R' is $CH_2$ and $n$ is an integer from 3 to 6, are provided.

Broadly, the difluoramines of the present invention are provided by reacting an amine with elemental fluorine in a liquid medium having a pH of from about 5.5 to about 9.5 at a temperature from about −10° C. to about 25° C. and in the presence of an acid acceptor. Specifically, difluoramines of the general structural formula $RNF_2$ are prepared by reacting an amine of the general formula $RNH_2$ with elemental fluorine in an aqueous medium having a pH of from about 5.5 to about 9.5 at a temperature of from about −10° C. to about 25° C., and in the presence of an acid acceptor; whereas, bisdifluoramines of the general formula $F_2NR'_mNF_2$ are prepared by reacting a diamine of the general formula $H_2NR'_mNH_2$ with elemental fluorine in an aqueous medium having a pH of from about 5.5 to about 9.5 at a temperature of from about −10° C. to 25° C., and in the presence of an acid acceptor.

The term acid acceptor, as used herein, is meant to denote a compound which will react with an acid to remove hydrogen ions or hydrated hydrogen ions from the solution. The nature of the acid acceptor is important. Preferably it does not contain any groups capable of reacting with fluorine. Ammonia, for example, would not be suitable as an acid acceptor because it would compete with the amine for the fluorine. This competition would lower the efficiency of the reaction.

By aliphatic we mean a radical comprising both paraffin radicals and dehydrogenated paraffin radicals commonly called olefins and acetylenes.

By cycloaliphatic radical we mean a radical of the above aliphatic type in which any two carbon atoms are joined to form a ring. The ring may have side chains as in methylcyclohexyl.

The pH of the system should be maintained at from about 5.5 to about 9.5. If the pH drops below 5.5 the amine group electrons are so firmly bound that fluorination is difficult and if the pH goes above 9.5 undesirable side reactions occur such as the formation of oxygen difluoride.

Sodium bicarbonate is the preferred acid acceptor because it keeps the pH at least at 5.5 but not above 9.5 because when the pH goes lower than 5.5 the bicarbonate reacts with the acid with release of carbon dioxide. Stronger bases such as sodium carbonate or sodium hydroxide and insoluble acid acceptors such as calcium carbonate may also be used but must be added at a rate such that the pH of the mixture stays between 5.5 and 9.5 whereas enough sodium bicarbonate may be present initially to complete the reaction without going outside of the optimum pH range. If the amine is completely fluorinated with perfect efficiency two moles of acid acceptor are necessary for every mole of amine. Generally, more acid acceptor than this minimum must be used.

The temperature of reaction must be low enough so that excessive decomposition does not occur but must be high enough to be above the freezing point of the aqueous solution. In general, a range of −10° C. to 25° C. will be suitable for carrying out the reaction. The preferred range is from 0 to 15° C.

The reaction time is not critical and can be varied over a wide range. Under certain conditions, limited conversion of the amine present is advantageous to prevent degradation of the thus formed difluoramino compound. Thus the overall yield of the reaction can be increased by converting only a small portion of the amine present to difluoramine, separating the difluoramine, recovering the unreacted amine and reusing it for subsequent fluorination.

Suitable amines for the practice of this invention include among others methylamine, ethylamine, propylamine, butylamine, amylamine, hexylamine, heptylamine, dodecylamine, cyclobutylamine, cyclopentylamine, cyclohexylamine, cycloheptylamine, cyclooctylamine, 1,4-diaminocyclohexane, 1,3-diaminocyclohexane, ethylenediamine, 1,2-propanediamine, 1,3-propanediamine, 1,4-butanediamine, 1,2-butanediamine, 1,3-butanediamine, 1,5-pentanediamine, 1,6-hexanediamine, 1,4-hexanediamine, 1,3-hexanediamine, 1,5-hexanediamine, 1,3-hexanediamine, 1,4-pentanediamine, 1,3-pentanediamine, 1,2-pentanediamine, propargylamine, 1,2-diaminocyclohexane, cyclopropylamine, cyclohexenylamine, allylamine, crotonylamine. Alternatively, the fluorination can be carried out in the presence of a solvent for the difluoramino compound which is not miscible with water and which does not react with fluorine. A suitable solvent is 1,1,2-trifluoro-1,2,2-trichloroethane, sold commercially as "Freon" 113. The solvent containing the difluoroamino compound can be continuously removed and replaced with fresh solvent, also on a continuous basis, with the product being removed from the former and the solvent recycled.

The products of the present invention are useful for incorporation into propellant compositions because of their energetic properties. The decomposition of the N-F bond is very energetic and the products of combustion are low in molecular weight, thus giving propellant compositions of high specific impulse, a desirable goal for propellants for rockets and missiles where saving in weight is important.

1,1-bis(difluoramines) and 1,2-bis(difluoramines) are somewhat unstable and on standing even at room temperature for only a few hours eliminate HF which attacks glass containers. The 1,3-, 1,4-, 1,5-, and 1,6-bis(difluoramines) of the instant case have improved stability to storage. 1,6-bis(diffuoramine)-hexane, for example, shows no sign of attacking glass even after storage for 2 weeks at room temperature. This improved and unexpected stability over the 1,1- and 1,2-bis(difluoramino) compounds imparts many advantages when high-energy bis-(difluoramino) compounds are incorporated into propellant compositions.

The invention is illustrated by the following examples which, however, are not limiting. Other modifications will be apparent to those skilled in the art. Parts, where given, are by weight.

EXAMPLE 1

A solution containing 19.8 parts of cyclohexylamine, 33.3 parts of sodium bicarbonate and 250 parts of water is cooled to 0° C. in a reaction vessel and stirred while passing in 3.8 parts of elemental fluorine per hour for 4 hours. The pH remained at 7 during the addition. The final aqueous solution is a clear yellow. It is extracted with methylene chloride. The extract is distilled to give 6.4 parts of crude N,N-difluorocyclohexylamine. Cyclohexylamine (11.1 parts) is recovered.

The identification of the pure compound is made by infrared, proton and fluorine nuclear magnetic resonance spectroscopy (hereinafter called NMR) and the elemental analysis. A doublet is observed in the fluorine NMR spectrum at 2365 cycles/second from trichlorofluoromethane, coupling constant ($J_{HF}$) 25 cycles/second. The proton spectrum shows, in addition to hydrogens typical of a cyclohexane ring, a proton absorption split into a triplet, coupling constant ($J_{HF}$) 25 cycles/second. These NMR spectra are those predicted for N,N-difluorocyclohexylamine. The major infrared absorption bands in the $-NF_2$ region are at 10.10, 10.40, 10.70, 11.46, 11.88, and 12.12 microns.

The compound contains 10.33% nitrogen as compared with a theoretical value of 10.36.

EXAMPLE 2 n-Butylamine (14.6 parts) is fluorinated according to the procedure in Example 1 at a pH of 7. The yield of crude $nC_4H_9NF_2$ is 12.5%. Identification of the purified product is made by infrared and NMR spectroscopy. The fluorine NMR spectrum has a broad peak at $-3080$ cycles per second ($CCl_3F$ reference, 56.4 megacycles per second). The proton NMR spectrum has a triplet at $-227$, $-198$, $-170$, coupling constant ($J_{HF}$) 28 cycles per second, $(CH_3)_4Si$ reference $-56$ megacycles/second. The above spectral information agrees with that predicted for difluoraminobutane.

EXAMPLE 3

An aqueous solution of 15 parts cyclopentylamine and 45 parts of sodium bicarbonate in 300 parts of water is fluorinated by a stream of 0.12 parts/minute of fluorine in 0.25 parts/minute of nitrogen for 6 hours at 0° C. at a pH of 7. The off-gas is passed through a trap cooled with solid carbon dioxide in which 1.2 parts of crude difluoraminocyclopentane collected. After purification of a portion of the sample by vapor phase chromatography, the product is identified by NMR and infrared spectroscopy. The major infrared peaks in the $-NF_2$ region are at 10.67 and 11.45. The yield of these peaks is consistent for the difluoraminocyclopentane. Substantially the same results are obtained when the above procedure is accomplished essentially as set forth with the exception that the temperature is 25° C.

EXAMPLE 4

A solution of 19.8 parts of cyclohexylamine, 75 parts of sodium bicarbonate, 200 parts of water and 100 parts of 1,1,2-trifluoro-1,2,2-trichloroethane is cooled at 0° C. Florine is passed through the solution at a rate of 3.8 parts per hour for 6.7 hours at a pH of 7. The "Freon" layer is then separated, dried and distilled, N,N-difluorocyclohexylamine identical to product from Example 1 (1.4 parts) is isolated boiling at 78° C. at 88 millimeters pressure. Cyclohexylamine (11.3 parts) is recovered.

EXAMPLE 5

A solution containing 23.2 parts of 1,6-hexanediamine, 66 parts $NaHCO_3$, 600 parts of water and 150 parts of fluorotrichloromethane is cooled to 0° C. and 14 parts of fluorine are passed into the solution through a sparger over a six hour period while maintaining the temperature at 0° C. and the pH at 7. The organic phase of the mixture is then separated from the aqueous phase and distilled to give 4.6 parts of a liquid product. This liquid product is then vaporized and passed through a gas chromatographic column consisting of silicone rubber deposited on diatomaceous earth. The product is thus separated into pure components. The chief component amounting to 2.2 parts is 1,6-bis(difluoramino)hexane. Its identity is established by elemental analysis and by infrared identification of the $NF_2$ group. The compound contains 40.1% fluorine, 37.9% carbon, 6.18% H and 14.6% nitrogen as compared with the theoretical values for 1,6-bis(difluoramino)-hexane of 40.5, 38.3, 6.39, and 14.9%, respectively.

The 1,6-bis(difluoramino)hexane shows no sign of decomposition on standing at room temperature over a period of two weeks. 1,1-bisdifluoramines and 1,2-bisdifluoramines on standing only a few days show signs of decomposition as evidenced by etching of glass containers in which they are placed. HF is one of the decomposition products.

When trimethylenediamine, tetramethylenediamine and pentamethylenediamine are used in place of the hexamethylenediamine, the corresponding bis(difluoramino) compounds are obtained.

Other uses and modifications will be apparent to those skilled in the art, therefore, we wish to be limited only by the following claims.

What is claimed is:

1. Bisdifluoramines of the structural formula

$$F_2N(CH_2)_nNF_2$$

wherein $n$ is an integer from 3 to 6.

2. The compound of claim 1 wherein $n$ is 6.
3. The compound of claim 1 wherein $n$ is 5.
4. The compound of claim 1 wherein $n$ is 4.
5. The compound of claim 1 wherein $n$ is 3.
6. A process for the preparation of difluoramines which comprises reacting an amine of the general structural formula $$RNH_2$$

where R is an aliphatic radical, said radical having an $H_2N$ substituent, with elemental fluorine in an aqueous medium having a pH from about 5.5 to about 9.5 at a temperature from about $-10°$ C. to about 25° C. and in the presence of an acid acceptor free of groups reactive with elemental fluorine.

7. The process of claim 6 in which R is $H_2N(CH_2)_n$. 

8. The process of claim 6 in which the acid acceptor is sodium bicarbonate.

References Cited

UNITED STATES PATENTS

| | | | |
|---|---|---|---|
| 2,490,099 | 12/1949 | Simons | 260—563 |
| 3,166,595 | 1/1965 | Frazer | 260—583 |

OTHER REFERENCES

Baumgarten et al., J.A.C.S., vol. 76, pp. 4561–4564 (1954).

Chattaway, J. Chem. Soc. (London), vol. of 1905, pp. 381–388.

Kingdon et al., J.A.C.S., vol. 72, pp. 1030–1031 (1950).

Jackson et al., J.A.C.S., vol. 69, pp. 1539–1540 (1947).

CHARLES B. PARKER, *Primary Examiner.*

CARL QUARFORTH, LEON D. ROSDOL, L. ZITVER, BENJAMIN R. PADGETT, *Examiners.*

J. W. WHISLER, F. D. HIGEL, L. A. SEBASTIAN, P. C. IVES, *Assistant Examiners.*